US008428223B2

(12) United States Patent
Thomas et al.

(10) Patent No.: US 8,428,223 B2
(45) Date of Patent: Apr. 23, 2013

(54) HIGH AVAILABILITY ARCHITECTURE FOR COMPUTER TELEPHONY INTERFACE DRIVER

(75) Inventors: Jayant Thomas, San Ramon, CA (US); Robert Samokar, North Haven, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1167 days.

(21) Appl. No.: 12/327,999

(22) Filed: Dec. 4, 2008

(65) Prior Publication Data

US 2010/0142687 A1 Jun. 10, 2010

(51) Int. Cl.
*H04M 1/24* (2006.01)
*H04M 3/08* (2006.01)
*H04M 3/22* (2006.01)
*H04M 11/00* (2006.01)

(52) U.S. Cl.
USPC ....... 379/1.01; 379/1.02; 379/1.03; 379/9.05; 379/93.01; 370/241; 370/242

(58) Field of Classification Search ........ 379/1.01–1.03, 379/9.05, 93.01; 370/241, 242
See application file for complete search history.

(56) References Cited

U.S. PATENT DOCUMENTS

| 6,868,067 B2* | 3/2005 | Rostron .................. 370/241 |
| 2004/0076178 A1* | 4/2004 | Botton .................. 370/466 |
| 2007/0041566 A1* | 2/2007 | Praturi et al. ............ 379/265.08 |
| 2007/0121822 A1* | 5/2007 | Carnale et al. ............ 379/88.14 |

OTHER PUBLICATIONS

U.S. Appl. No. 12/328,333 to Thomas et al., filed Dec. 4, 2008.

* cited by examiner

*Primary Examiner* — Wesley Kim
(74) *Attorney, Agent, or Firm* — Greenblum & Bernstein, P.L.C.

(57) ABSTRACT

A method of providing communication services includes configuring a primary computer telephony interface driver to interface a computer telephony interface server with an application for transmitting client information between the application and the computer telephony interface server and configuring a secondary computer telephony interface driver to redundantly interface the same computer telephony interface server with the same application for transmitting the same client information between the same application and the same computer telephony interface server.

19 Claims, 5 Drawing Sheets

US 8,428,223 B2

HIGH AVAILABILITY ARCHITECTURE FOR COMPUTER TELEPHONY INTERFACE DRIVER

BACKGROUND

1. Field of the Disclosure

The present disclosure relates to computer telephony systems. More particularly, the present disclosure relates to interfacing computer telephony interface drivers with applications.

2. Background Information

Recently, there has been an increased integration of computer systems with the existing telephony infrastructure. One system for accomplishing such an integration is a computer telephony interface (CTI) server. An exemplary CTI server is the I-Server from Genesys Telecommunications Laboratories, Inc.

The CTI server is capable of communicating with telephone calls to manage calls and data associated with calls. For example, an incoming telephone call, placed by a caller, may be received by an interactive voice response (IVR) application. The IVR application generally plays recorded messages to the caller and receives either responses entered by the caller on a touchtone telephone keypad or voice responses communicated by the caller that can be converted to text. A CTI driver interfaces the IVR application with the CTI server for transmitting responses received by the IVR application to the CTI server for storage and for transmitting data from the CTI server to the IVR application for distribution to the client.

DETAILED DESCRIPTION

Figure 1:
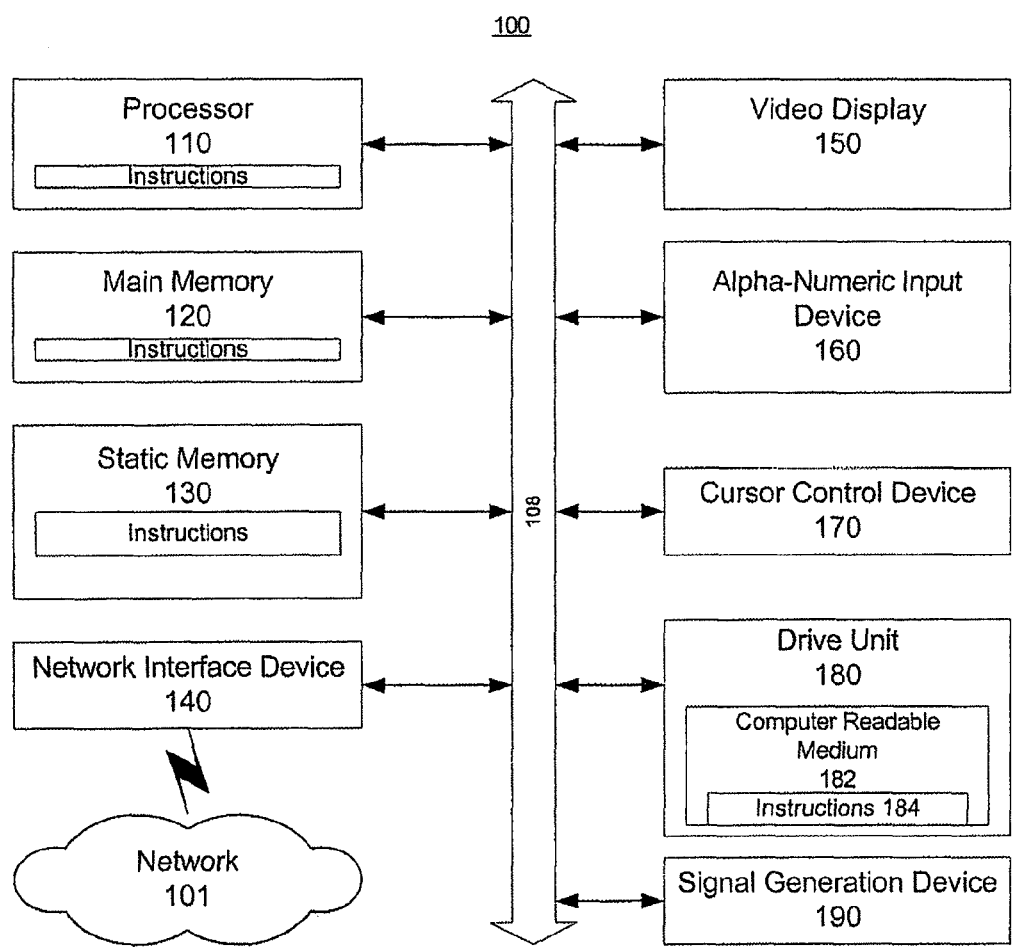
FIG. 1 shows an exemplary general computer system that includes a set of instructions for providing redundancy of a CTI driver.

In view of the foregoing, the present disclosure, through one or more of its various aspects, embodiments and/or specific features or sub-components, is thus intended to bring out one or more of the advantages as specifically noted below.

According to an embodiment of the present disclosure, a method of providing communication services includes configuring a primary CTI driver to interface a CTI server with an application for transmitting client information between the application and the CTI server, and configuring a secondary CTI driver to redundantly interface the same CTI server with the same application for transmitting the same client information between the same application and the same CTI server.

According to one aspect of the present disclosure, the primary CTI driver is monitored using a primary monitor According to another aspect of the present disclosure, the secondary CTI driver is configured to interface the CTI server with the application in response to monitoring a failure of the primary CTI driver using the primary monitor.

According to yet another aspect of the present disclosure, the secondary CTI driver is monitored using a secondary monitor.

According to still another aspect of the present disclosure, the primary and secondary monitors monitor one another, the primary monitor launches the primary CTI driver to interface the CTI server with the application in response to the primary monitor monitoring, on the secondary monitor, a failure of the secondary CTI driver, and the secondary monitor launches the secondary CTI driver to interface the CTI server with the application in response to the secondary monitor monitoring, on the primary monitor, a failure of the primary CTI driver.

According to an additional aspect of the present disclosure, the monitors monitor one another using hypertext transfer protocol.

According to another aspect of the present disclosure: the client information is transmitted between the application and a CTI bridge, between the CTI bridge and a queue, between the queue and at least one of the CTI drivers, and between the at least one of the CTI drivers and the CTI server; and the monitors communicate a status of the CTI drivers to the CTI bridge.

According to yet another aspect of the present disclosure, the primary CTI driver is stored in a first server and the secondary CTI driver is stored in a second server different than the first server.

According to still another aspect of the present disclosure, a plurality of secondary CTI drivers are configured to redundantly interface the same CTI server with the same application to provide multiple redundancy of the primary CTI driver.

According to an additional aspect of the present disclosure, the application is an interactive voice response application.

According to another embodiment of the present disclosure, a system for providing communication services includes a primary CTI driver configured to interface a CTI server with an application for transmitting client information between the application and the CTI server, and a secondary CTI driver configured to redundantly interface the same CTI server with the same application for transmitting the same client information between the same application and the same CTI server.

According to one aspect of the present disclosure, a primary monitor is configured to monitor the primary CTI driver According to another aspect of the present disclosure, the secondary CTI driver is configured to interface the CTI server with the application in response to the primary monitor monitoring a failure of the primary CTI driver.

According to yet another aspect of the present disclosure, a secondary monitor is configured to monitor the secondary CTI driver According to still another aspect of the present disclosure, the primary and secondary monitors are configured to monitor one another, the primary CTI driver is configured to interface the CTI server with the application in response to the primary monitor monitoring, on the secondary monitor, a failure of the secondary CTI driver, and the secondary CTI driver is configured to interface the CTI server with the application in response to the secondary monitor monitoring, on the primary monitor, a failure of the primary CTI driver.

According to an additional aspect of the present disclosure, the primary CTI driver is stored in a first server and the secondary CTI driver is stored in a second server different than the first server.

According to another aspect of the present disclosure, a plurality of secondary CTI drivers are each configured to redundantly interface the same CTI server with the same application to provide multiple redundancy of the primary CTI driver.

According to another embodiment of the present disclosure, a computer readable medium for storing a computer program for providing communication services includes a primary driver code segment that interfaces a CTI server with an application for transmitting client information between the application and the CTI server, and a secondary driver code segment that redundantly interfaces the same CTI server with the same application for transmitting the same client information between the same application and the same CTI server.

According to one aspect of the present disclosure, a control code segment configures the secondary driver code segment to interface the CTI server with the application in response to a failure of the primary driver code segment.

According to another aspect of the present disclosure, a plurality of the secondary driver code segments redundantly interface the same CTI server with the same application to provide multiple redundancy of the primary driver code segment.

FIG. 1 is an illustrative embodiment of a general computer system, on which a method to provide redundancy of a CTI driver can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
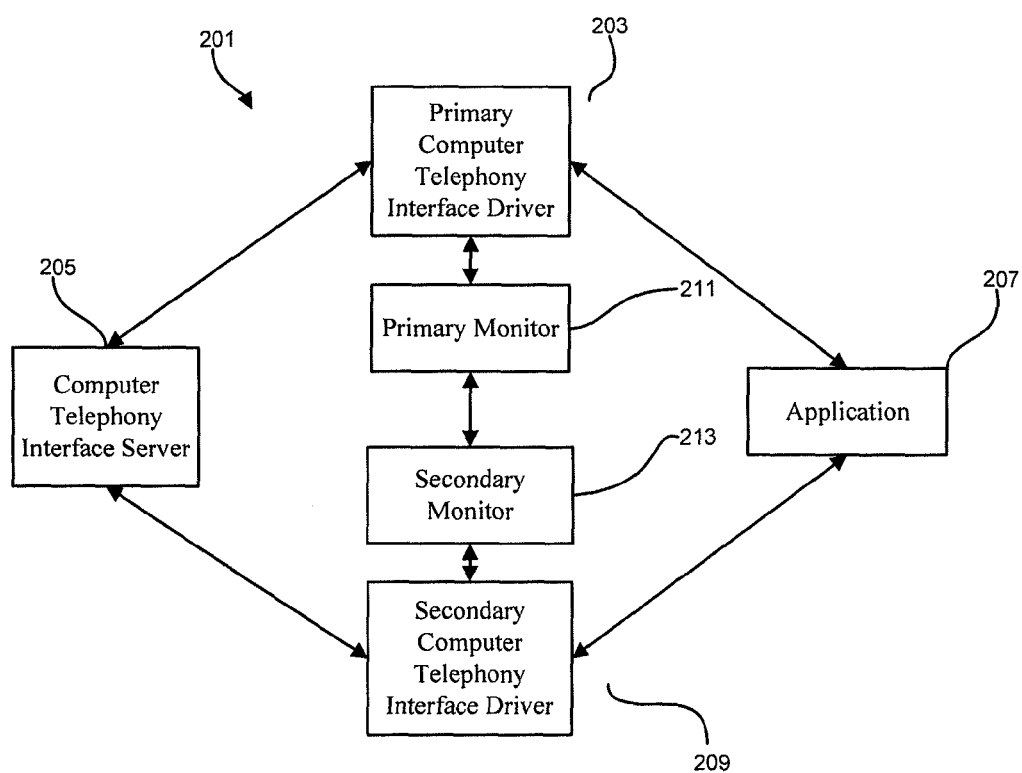
FIG. 2 is a schematic view of a computer telephony system including redundant CTI drivers, according to an aspect of the present disclosure.

A system for providing communication systems 201 is generally shown in FIG. 2. The system 201 includes a primary CTI driver 203 configured to interface a CTI server 205 with an application 207 for transmitting client information between the application 207 and the CTI server 205. The CTI server 205 may be any computer that makes services, such as, but not limited to, access to data files, available to applications on a network in a computer telephony integration system. An exemplary CTI server 205 is the I-Server from Genesys Telecommunications Laboratories, Inc. The application 207 may be any server or program stored in a computer readable medium which interfaces with the CTI server 205 to perform a task. In an exemplary embodiment of the system 201, the application 207 is an interactive voice response application. In another embodiment of the system 201, the application 207 may be a user interface client which may allow users of the CTI server 205 to examine data that is stored in the CTI server 205. Exemplary user interface clients include enterprise access service layer applications, perifonics applications, and call setup applications. In further embodiments of the of the system 201, those skilled in the art appreciate that other applications may be used in the system 201 such as, for example, a queue.

The system 201 additionally includes a secondary CTI driver 209 configured to redundantly interface the same CTI server 205 with the same application 207 for transmitting the same client information between the same application 207 and the same CTI server 205.

In the system 201 as shown in FIG. 2, the primary and secondary CTI drivers 203, 209 may retrieve messages from the application 207 and transmit the messages to the CTI server 205. The primary and secondary CTI drivers 203, 209 may also receive responses from the CTI server 205 and transmit the responses to the application 207.

The CTI drivers 203, 209 may receive a message from the application 207 by monitoring the application 207 for a message that is directed to the CTI server 205. When such a message is located on the application 207, either the primary or secondary CTI driver 203, 209 retrieves the message from the application and sends the message to the CTI server 205. In an embodiment of the system 201, the CTI drivers 203, 209 may locate messages on the application 207 by periodically polling the application 207 to request the next message to be handled. Additionally, or alternatively, the CTI drivers 203, 209 may employ other methods of determining when messages are waiting on the application 207. For example, the CTI drivers 203, 209 may receive a broadcast from the application 207 indicating that a message is waiting, may examine a bit or flag that indicates when a messages is waiting, etc.

The CTI drivers 203, 209 may receive a response from the CTI server 205 by monitoring the CTI server 205 for a broadcast from the CTI server 205 that a response is ready. Additionally, or alternatively, the CTI drivers 203, 209 may periodically poll the CTI server 205 to determine when a response is ready. The CTI drivers 203 receive a response from the CTI server 205 and prepare a message (e.g., marshal the response) for retransmission to the application 207.

In the system 201 as shown in FIG. 2, the primary and secondary CTI drivers 203, 209 are configured to interface a single application 207 with a CTI server 205. However, in alternative embodiments, the primary and secondary CTI drivers 203, 209 may be configured to interface multiple applications 207 with the CTI server 205. For example, the primary and secondary CTI drivers 203, 209 may be associated with a single CTI server 205 and may only retrieve messages from an application 207 that is associated with that CTI server 205. Alternatively, the primary and secondary CTI drivers 203, 209 may interface multiple applications 207 with a CTI server 205, but may only retrieve messages that are associated with the CTI server 205 by checking a parameter associated with the messages. Of course, persons of ordinary skill in the art will readily appreciate that other monitoring apparatus are likewise appropriate.

In providing redundancy, a primary monitor 211 is preferably configured to monitor the primary CTI driver 203, and the secondary CTI driver 209 is configured to interface the CTI server 205 with the application 207 in response to the primary monitor 211 monitoring a failure of the primary CTI driver 203. Additionally, as shown in FIG. 2, a secondary monitor 213 may be configured to monitor the secondary CTI driver 209. In such an embodiment, the primary CTI driver 209 may be configured to interface the CTI server 205 with the application 207 in response to the secondary monitor 213 monitoring a failure of the secondary CTI driver 209. Furthermore, the primary and secondary monitors 211, 213 preferably monitor each other for detecting failures of the primary and secondary CTI drivers 203, 209. The primary and secondary monitors 211, 213 may monitor each other using any standard real-time protocols such as, but not limited to, HTTP, TCP/IP, and UDP protocols. However, HTTP is currently preferable due to its simplicity.

In an embodiment of the system 201, the primary CTI driver 203 is stored in a first server while the secondary CTI driver is stored in a second server different than the first server. In such an embodiment, either the first or the second server can be shut down for maintenance activities due to any software upgrades without impacting the performance of the system 201.

In an additional embodiment of the system 201, a plurality of secondary CTI drivers 209 may each be configured to redundantly interface the same CTI server 205 with the same application 207 to provide multiple redundancy of the primary CTI driver 203.

In another embodiment of the system 201, the application 207 transmits a message to a queue. In such an embodiment, one of the CTI drivers 203, 209 retrieves the message from the queue and sends the message to the CTI server 205. The CTI server 205 generates a response to the message, one of the CTI drivers 203, 209 retrieves the response from the CTI server 205, and the retrieving CTI driver 203, 209 sends the response to the queue. In such an embodiment, a CTI bridge takes the response from the queue and returns it to the application 207. The CTI bridge may also convert or adapt some or all of the response from the CTI server 205 into another format. Additionally, in such an embodiment, the monitors 211, 213 communicate with the CTI bridge to relay any changes in the status of the CTI drivers 203, 209 to the CTI bridge. Java based Management Beans or MBean is preferably used for this purpose.

Figure 3:
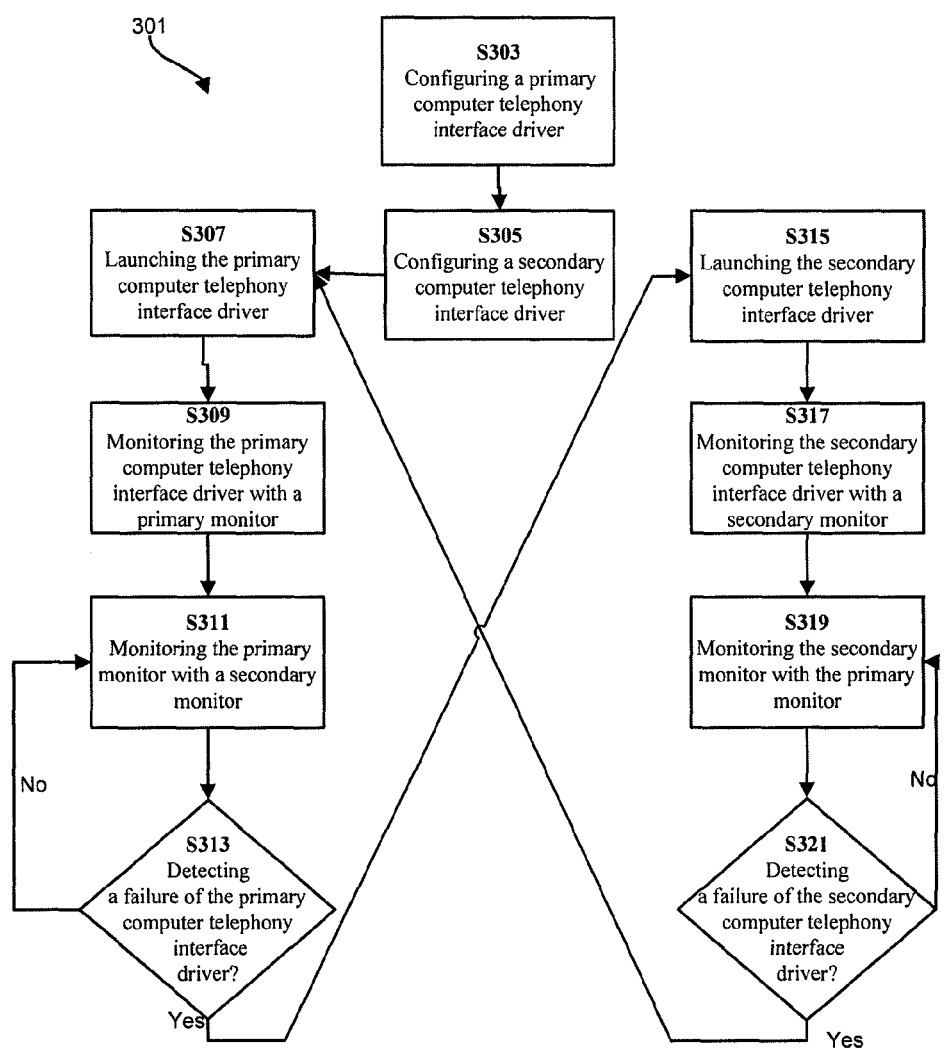
FIG. 3 is a process flow diagram for providing redundancy of a CTI driver, according to an aspect of the present disclosure.

A method of providing communication services 301 is generally shown in FIG. 3. In step S303 a primary CTI driver is configured to interface a CTI server with an application 207 for transmitting client information between the application and the CTI server. In step S305, a secondary CTI driver is configured to redundantly interface the same CTI server with the same application for transmitting the same client information between the same application 207 and the same CTI server.

In the method 301 as shown in FIG. 3, the primary CTI driver serves as the master or primary driver while the secondary CTI driver serves as the slave or secondary driver. Accordingly, in step S307, the primary CTI server is initially launched to interface the CTI server with the application.

In step S309, the primary CTI driver is monitored using a primary monitor, and in step S311, the primary monitor is monitored with a secondary monitor. If the secondary monitor monitors, on the primary monitor, a failure of the primary CTI driver at step S313, the secondary monitor launches the secondary CTI driver to interface the CTI server with the application at step S315.

After the secondary CTI driver is launched, in step S317, the secondary CTI driver is monitored with the secondary monitor, and in step S319, the secondary monitor is monitored with the primary monitor. If the primary monitor monitors, on the secondary monitor, a failure of the secondary CTI driver at step S321, the primary monitor launches the primary CTI driver to interface the CTI server with the application at step S307. If a failure of either the primary or secondary CTI driver is not detected at steps S313 and S321 respectively, the monitors continue to monitor each other for a failure of either the primary or secondary CTI driver.

Figure 4:
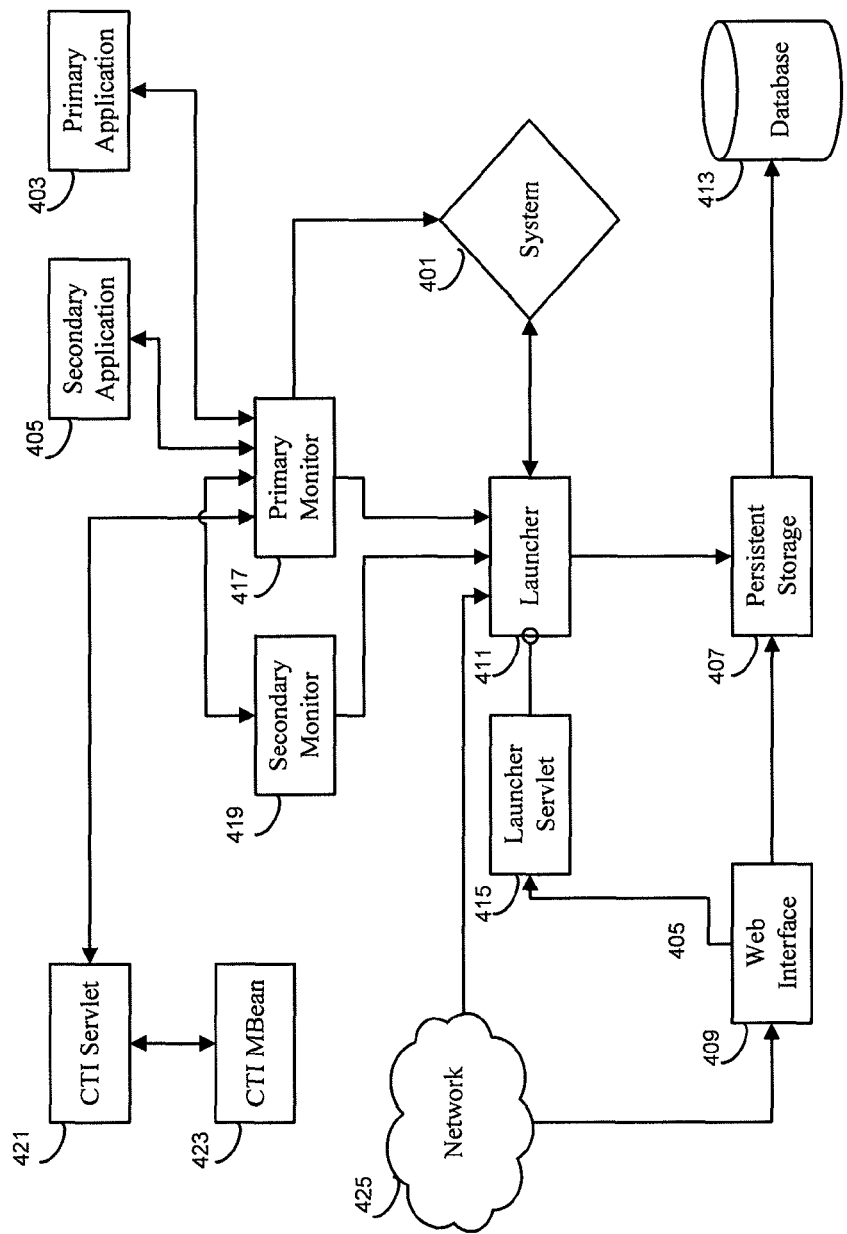
FIG. 4 is a schematic view of a program for providing communication services using a computer telephony system, according to an aspect of the present disclosure.
Figure 5:
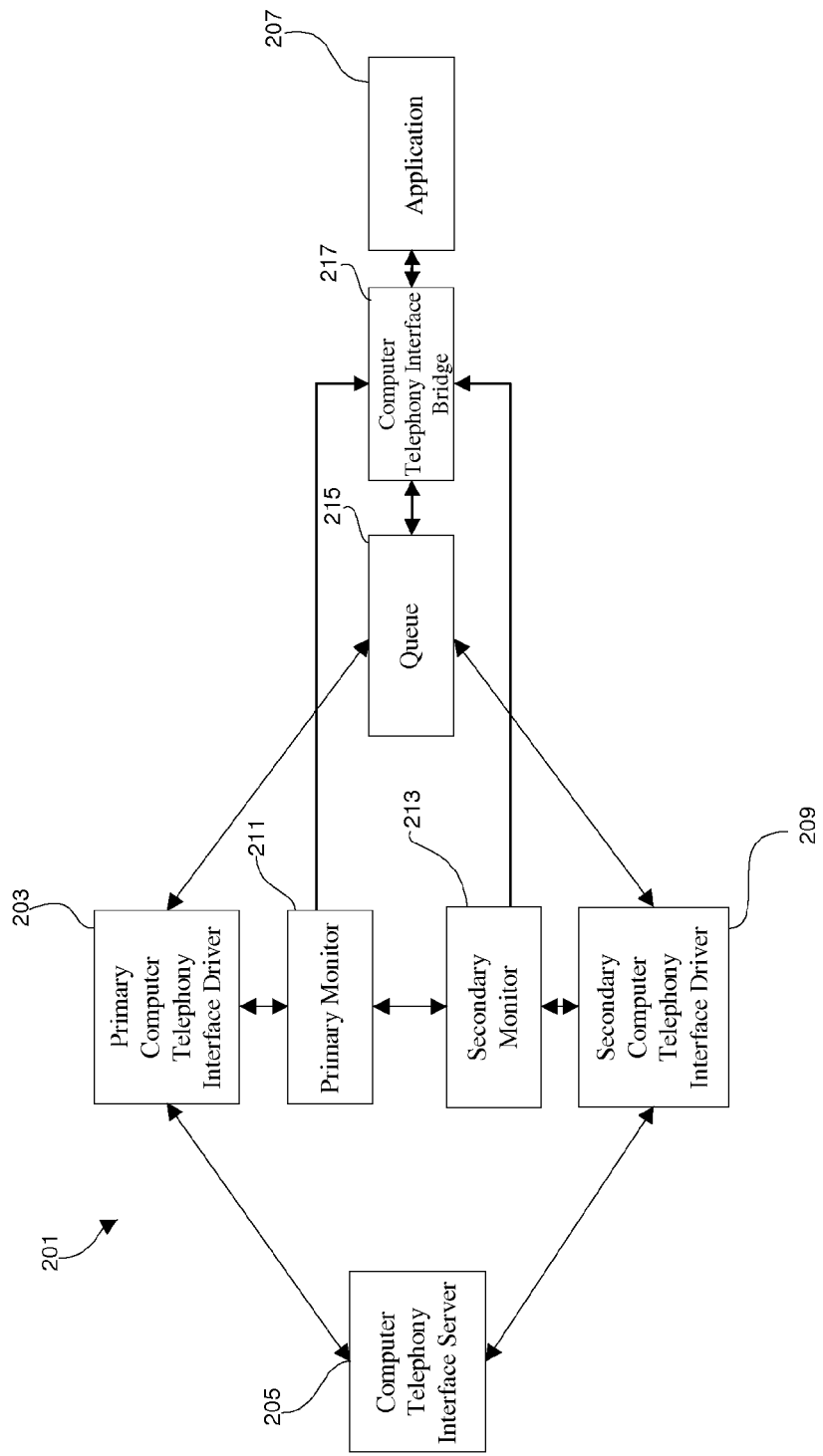
FIG. 5 is a schematic view of a computer telephony system including redundant CTI drivers, according to an aspect of the present disclosure.

FIG. 4 illustrates a program for controlling a system 401 for providing communication services wherein primary and secondary CTI drivers (not shown) interface primary and secondary applications 403, 405 with a CTI server (not shown) and wherein the program includes a CTI bridge. The CTI bridge includes a CTIDriveManager module which contains four modules: a persistent storage module 407, a web interface module 409, a launcher module 411, and a monitor module.

The persistent storage module 407 stores mapping and configuration rules. The mapping and configuration rules are preferably implemented as database tables, a set of classes for accessing and updating tables, and a Java Naming and Directory Interface configuration for accessing a database 413. The database 413 may be any type of data storage capable of storing information that may be used by the CTI server. The persistent storage module 407 also preferably has an abstract interface for other possible implementations.

Web interface module 409 defines the set of web pages (JavaServer Pages and HyperText Markup Language) that preferably presents the configuration stored in the persistent storage module 407 to an end-user and allows updating it. The web interface module 409 is accessible to the end-user via a network 425. The web interface module 409 also preferably provides access to a launcher servlet 415; in other words, the web interface module 409 provides the ability to remotely start the CTI drivers. In the case of a remote start, the output for each instance started remotely is preferably displayed on the web interface module 409 to identify a successful (or unsuccessful) start.

The launcher module 411 is the module that preferably launches the CTI drivers to interface the CTI server with the applications 403, 405. The launcher module is preferably implemented as a stand alone application and a launcher servlet 415 for remote access via the web interface module 409. The primary and secondary monitors 417, 419 start, stop, and manage the CTI drivers using the launcher module 411. The launcher module 411 preferably manages the CTI drivers with parameters read from the database 413.

The monitor module is a stand alone application that causes the primary and secondary monitors 417, 419 to periodically check if the CTI drivers are still running, or if they have failed. If one of the CTI drivers has failed, then one of the monitors 417, 419 starts the other CTI driver using the launcher module 407. The monitor module configures each monitor 417, 419 to operate in one of two states: primary monitor state and backup monitor state. One of the monitors 417, 419 preferably operates in the primary monitor state while the other monitor 417, 419 operates the backup monitor state. The monitor 417, 419 operating under the primary monitor state launches the appropriate CTI driver and also opens a communication channel with the other monitor 417, 419 operating under the backup monitor state. The monitor 417, 419 operating under the backup monitor state does not launch a CTI driver but keeps alive the communication channel with the other monitor 417, 419 which is operating under the primary monitor state. If the monitor 417, 419 operating under the backup monitor state detects a failure of the CTI driver being monitored by the other monitor 417, 419 operating under the primary monitor state, it launches the CTI driver it is monitoring and begins operating under the primary monitor state.

The monitor module also preferably causes the primary and secondary monitors 417, 419 to periodically check the primary and secondary applications 403, 405 for any failures.

In the case of a failure of one of the applications 403, 405, the monitor module initiates the CTI servlet 421 to switch to the other application 403, 405. The CTI servlet 421 supports refreshing the CTI MBean 423 which in turn updates the singleton. The CTI Mbean 423 refreshes the singleton to swap to the other application 403, 405. Additionally, or alternatively, the CTI servlet 421 may employ any other method of switching to the other application 403, 405.

Accordingly, the present invention enables high availability for CTI drivers. Although most of the components of the CTI infrastructure are highly available, currently available CTI drivers do not have automatic failover and hence they impact the performance of the whole system by reducing uptime and thereby degrading customer service. Furthermore, currently available CTI drivers need manual intervention to restart the process on a different server in case of failure, which further adds to the downtime for the call center operations. During this downtime, CTI functions are lost, forcing the customer care agents to rely on manual routing processes which further degrades customer service. In contradistinction, according to the present invention, customer care agents do not lose access to CTI functions in the event of a failure of the primary CTI driver 203 as the secondary CTI driver 209 interfaces the CTI server 205 with the application 207. Accordingly, by adding high availability to the CTI driver, customer service is improved.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present disclosure is not limited to computer telephony systems. Further, the present disclosure is not limited to use with regard to customer care centers. Rather, the invention may be applied in any pertinent situation where a driver is required to interface an a server with an application.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission of computer telephony systems represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing communication services, comprising:

configuring a primary computer telephony interface driver to interface a computer telephony interface server with an application for transmitting client information between the application and the computer telephony interface server; and configuring a secondary computer telephony interface driver to redundantly interface the computer telephony interface server with the application for transmitting the client information between the application and the computer telephony interface server, wherein the client information is transmitted between the application and a computer telephony interface bridge, between the computer telephony interface bridge and a queue, between the queue and one of the primary computer telephony interface driver and the secondary computer telephony interface driver, and between the one of the primary computer telephony interface driver and the secondary computer telephony interface driver and the computer telephony interface server, a status of the primary computer telephony interface driver and the secondary computer telephony interface driver is monitored, and the status of the primary computer telephony interface driver and the secondary computer telephony interface driver is communicated to the computer telephony interface bridge.

2. The method as set forth in claim 1, wherein the primary computer telephony interface driver is monitored using a primary monitor.

3. The method as set forth in claim 2, wherein the secondary computer telephony interface driver is configured to interface the computer telephony interface server with the application in response to monitoring a failure of the primary computer telephony interface driver using the primary monitor.

4. The method as set forth in claim 2, wherein the secondary computer telephony interface driver is monitored using a secondary monitor.

5. The method as set forth in claim 4, wherein:

the primary monitor and the secondary monitor monitor one another;

the primary monitor launches the primary computer telephony interface driver to interface the computer telephony interface server with the application in response to the primary monitor monitoring, on the secondary monitor, a failure of the secondary computer telephony interface driver; and the secondary monitor launches the secondary computer telephony interface driver to interface the computer telephony interface server with the application in response to the secondary monitor monitoring, on the primary monitor, a failure of the primary computer telephony interface driver.

6. The method as set forth in claim 5, wherein the primary monitor and the secondary monitor monitor one another using hypertext transfer protocol.

7. The method as set forth in claim 1, wherein the primary computer telephony interface driver is stored in a first server and the secondary computer telephony interface driver is stored in a second server different than the first server.

8. The method as set forth in claim 1, wherein a plurality of secondary computer telephony interface drivers are configured to redundantly interface the computer telephony interface server with the application to provide multiple redundancy of the primary computer telephony interface driver.

9. The method as set forth in claim 1, wherein the application is an interactive voice response application.

10. A system for providing communication services, comprising:
- a processor; and
- a memory storing:
    - a primary computer telephony interface driver that, when executed by the processor, interfaces a computer telephony interface server with an application for transmitting client information between the application and the computer telephony interface server; and
    - a secondary computer telephony interface driver that, when executed by the processor, redundantly interfaces the computer telephony interface server with the application for transmitting the client information between the application and the computer telephony interface server,
- wherein the client information is to be transmitted between the application and a computer telephony interface bridge, between the computer telephony interface bridge and a queue, between the queue and one of the primary computer telephony interface driver and the secondary computer telephony interface driver, and between the one of the primary computer telephony interface driver and the secondary computer telephony interface driver and the computer telephony interface server,
- a status of the primary computer telephony interface driver and the secondary computer telephony interface driver is configured to be monitored, and
- the status of the primary computer telephony interface driver and the secondary computer telephony interface driver is configured to be communicated to the computer telephony interface bridge.

11. The system as set forth in claim 10, further comprising a primary monitor configured to monitor the primary computer telephony interface driver.

12. The system as set forth in claim 11, wherein the secondary computer telephony interface driver is configured to interface the computer telephony interface server with the application in response to the primary monitor monitoring a failure of the primary computer telephony interface driver.

13. The system as set forth in claim 11, further comprising a secondary monitor configured to monitor the secondary computer telephony interface driver.

14. The system as set forth in claim 13, wherein:
- the primary monitor and the secondary monitor are configured to monitor one another;
- the primary computer telephony interface driver is configured to interface the computer telephony interface server with the application in response to the primary monitor monitoring, on the secondary monitor, a failure of the secondary computer telephony interface driver; and
- the secondary computer telephony interface driver is configured to interface the computer telephony interface server with the application in response to the secondary monitor monitoring, on the primary monitor, a failure of the primary computer telephony interface driver.

15. The system as set forth in claim 10, wherein the primary computer telephony interface driver is stored in a first server and wherein the secondary computer telephony interface driver is stored in a second server different than the first server.

16. The system as set forth in claim 10, further comprising:
- a plurality of secondary computer telephony interface drivers, each configured to redundantly interface the computer telephony interface server with the application to provide multiple redundancy of the primary computer telephony interface driver.

17. A non-transitory computer readable medium encoded with an executable computer program for providing communication services that, when executed by a processor, causes the processor to perform operations comprising:
- configuring a primary computer telephony interface driver to interface a computer telephony interface server with an application for transmitting client information between the application and the computer telephony interface server; and
- configuring a secondary computer telephony interface driver to redundantly interface the computer telephony interface server with the application for transmitting the client information between the application and the computer telephony interface server,
- wherein the client information is to be transmitted between the application and a computer telephony interface bridge, between the computer telephony interface bridge and a queue, between the queue and one of the primary computer telephony interface driver and the secondary computer telephony interface driver, and between the one of the primary computer telephony interface driver and the secondary computer telephony interface driver and the computer telephony interface server,
- a status of the primary computer telephony interface driver and the secondary computer telephony interface driver is configured to be monitored, and
- the status of the primary computer telephony interface driver and the secondary computer telephony interface driver is configured to be communicated to the computer telephony interface bridge.

18. The non-transitory computer readable medium of claim 17, wherein
the secondary computer telephony interface driver is configured to interface the computer telephony interface server with the application in response to a failure of the primary driver code segment.

19. The non-transitory computer readable medium of claim 17, wherein the executable computer program further causes the processor to perform:
- configuring a plurality of the secondary computer telephony interface drivers to each redundantly interface the computer telephony interface server with the application to provide multiple redundancy of the primary computer telephony interface driver.

* * * * *